United States Patent
Suzuki

(10) Patent No.: US 10,863,039 B2
(45) Date of Patent: Dec. 8, 2020

(54) INFORMATION PROCESSING APPARATUS THAT OUTPUTS PARAMETER ON BASIS OF LEARNING RESULT

(71) Applicant: FUJI XEROX CO., LTD., Tokyo (JP)

(72) Inventor: Toru Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/545,131

(22) Filed: Aug. 20, 2019

(65) Prior Publication Data
US 2020/0304652 A1 Sep. 24, 2020

(30) Foreign Application Priority Data
Mar. 22, 2019 (JP) ................................. 2019-054132

(51) Int. Cl.
*H04N 1/00* (2006.01)
*H04N 1/32* (2006.01)

(52) U.S. Cl.
CPC ....... *H04N 1/00212* (2013.01); *H04N 1/0022* (2013.01); *H04N 1/00228* (2013.01); *H04N 1/32122* (2013.01)

(58) Field of Classification Search
CPC ........... H04N 1/00212; H04N 1/32122; H04N 1/0022; H04N 1/00228
See application file for complete search history.

(56) References Cited

U.S. PATENT DOCUMENTS

| 7,006,241 B1* | 2/2006 | Yamamoto | H04N 1/00212 358/1.15 |
| 2006/0123086 A1* | 6/2006 | Morris | H04N 1/32117 709/206 |
| 2007/0223286 A1* | 9/2007 | Suda | G11C 16/102 365/185.29 |
| 2009/0164596 A1* | 6/2009 | Sakiyama | H04N 1/00212 709/206 |

FOREIGN PATENT DOCUMENTS

| JP | 2005-250594 A | 9/2005 |
| JP | 2006-135570 A | 5/2006 |
| JP | 2010-134810 A | 6/2010 |

OTHER PUBLICATIONS

English Machine Translation of JP 2005-250594-A (Yamaguchi et al., Published Sep. 15, 2005) (Year: 2005).*

* cited by examiner

*Primary Examiner* — Juan M Guillermety
(74) *Attorney, Agent, or Firm* — Oliff PLC

(57) ABSTRACT

An information processing apparatus includes a receiving unit that receives an operation for specifying an image to be subjected to processing and an operation for determining a parameter to be used in the processing, an execution unit that performs processing based on the determined parameter on the specified image, and an output unit that outputs, when the receiving unit receives an operation for specifying a new image, a parameter that has a particular relationship with a feature of the new image on a basis of a learning result obtained by a learning unit that learns a relationship between (Continued)

a parameter used in the processing that has been performed before by the execution unit and a feature of an image that has undergone the processing.

10 Claims, 6 Drawing Sheets

| IMAGE INFORMATION | | | | | PARAMETER | | |
|---|---|---|---|---|---|---|---|
| IMAGE DATA | SIZE | NUMBER OF COLUMNS | NUMBER OF ROWS | · · | DESTINATION | IMAGE QUALITY | · · |
| IMG001 | · · · | · · · | · · · | · · | 03-xxxx-xxxx | HIGH | · · |
| IMG002 | · · · | · · · | · · · | · · | 06-xxxx-xxyy | MIDDLE | · · |
| IMG003 | · · · | · · · | · · · | · · | 03-xxxx-xxzz | HIGH | · · |
| · · · | · · · | · · · | · · · | · · | · · · | · · · | · · |

FIG. 5

| COMPANY NAME | | PURCHASE ORDER | ○○○ |
| TITLE | | | ○○○ |
| | | XX CO., LTD. | |
| TOTAL AMOUNT | | 〒○○○ | |

| ○ ○ | ○○○ | ○ | ○○ | ○ | ○ | ○ |
|---|---|---|---|---|---|---|
| | | | | | | |
| | | | | | | |
| | | | | | ○ | |
| | | | | | ○ | |
| | | | | | ○ | |

FIG. 6

ORDER SHEET

YYYY/MM/DD ~ YYYY/MM/DD

INFORMATION PROCESSING APPARATUS THAT OUTPUTS PARAMETER ON BASIS OF LEARNING RESULT

CROSS-REFERENCE TO RELATED APPLICATIONS

This application is based on and claims priority under 35 USC 119 from Japanese Patent Application No. 2019-054132 filed Mar. 22, 2019.

BACKGROUND

(i) Technical Field

The present disclosure relates to an information processing apparatus.

(ii) Related Art

Japanese Unexamined Patent Application Publication No. 2006-135570 describes a technology for storing a history of destinations to which faxes have been transmitted in the past by a logged-in user and displaying the history when a new document is transmitted such that the user may easily select a destination of the new document from the history.

When processing using an image (image transmission processing in the above-described technology) is performed, the time and effort needed for specifying a parameter (a destination in the above-described technology) in new processing may be reduced by using a history as in the above-described technology. However, the number of destinations that are displayed as the history increases as the number of transmission destinations used in the past increases, and thus, it takes more time and effort to find a desired transmission destination among the displayed destinations.

SUMMARY

Aspects of non-limiting embodiments of the present disclosure relate to reducing the time and effort that is expended by a user when processing using an image is performed more than that in the case of simply outputting a history of parameters that have been used in the past.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a receiving unit that receives an operation for specifying an image to be subjected to processing and an operation for determining a parameter to be used in the processing, an execution unit that performs processing based on the determined parameter on the specified image, and an output unit that outputs, when the receiving unit receives an operation for specifying a new image, a parameter that has a particular relationship with a feature of the new image on a basis of a learning result obtained by a learning unit that learns a relationship between a parameter used in the processing that has been performed before by the execution unit and a feature of an image that has undergone the processing.

BRIEF DESCRIPTION OF THE DRAWINGS

Exemplary embodiments of the present disclosure will be described in detail based on the following figures, wherein:

FIG. 5 is a diagram illustrating an example of an image that is specified as a processing target;

FIG. 6 is a diagram illustrating another example of the image that is specified as the processing target;

DETAILED DESCRIPTION

[1] Exemplary Embodiment

Figure 1:
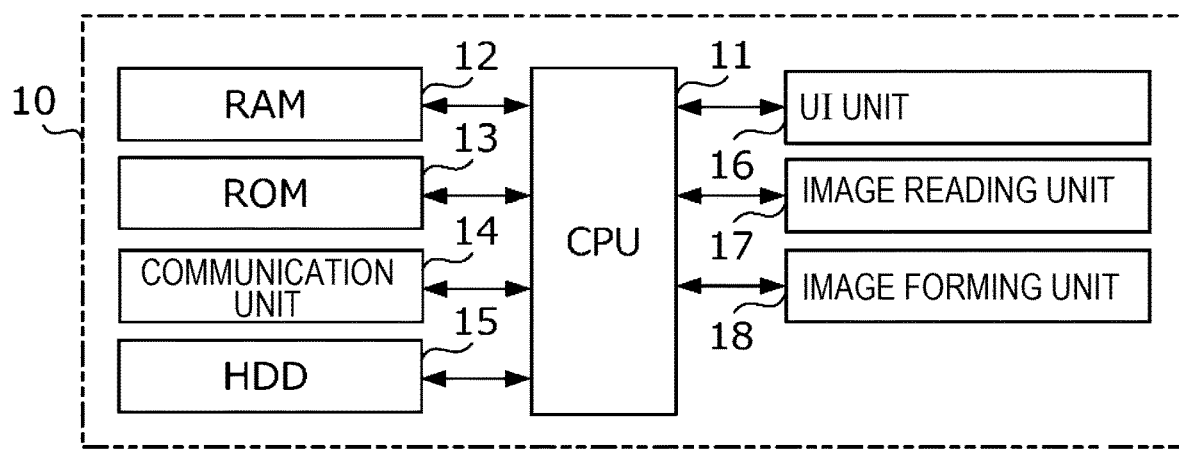
FIG. 1 is a diagram illustrating a hardware configuration of an image processing apparatus according to an exemplary embodiment.

FIG. 1 is a diagram illustrating a hardware configuration of an image processing apparatus 10 according to an exemplary embodiment of the present disclosure. The image processing apparatus 10 is a computer that includes a central processing unit (CPU) 11, random access memory (RAM) 12, read only memory (ROM) 13, a communication unit 14, a hard disk drive (HDD) 15, a user interface (UI) unit 16, an image reading unit 17, and an image forming unit 18. The image processing apparatus 10 according to the present exemplary embodiment is a multifunction machine that has a facsimile (FAX) communication function, a copy function, and a print function.

The CPU 11 controls the operation of each unit by running programs stored in the ROM 13 and the HDD 15 while using the RAM 12 as a work area. The communication unit 14 includes an antenna, a communication circuit, and so forth and performs communication via a communication line. The communication unit 14 according to the present exemplary embodiment transmits an image that is read from a medium placed on the image processing apparatus 10 to a communication target and receives an image from the communication target.

The HDD 15 stores data items and programs to be used by the CPU 11 that performs control. The UI unit 16 includes a touch screen that has a display, which is a display unit, and a touch panel, which is provided on a surface of the display. The UI unit 16 displays an image and receives an operation from a user. In addition to the touch screen, the UI unit 16 includes an operator such as a keyboard and receives an operation that is performed on the operator.

The image reading unit 17 is a scanner that reads an image from a medium placed on the image processing apparatus 10. The image forming unit 18 forms an image onto a medium by transferring the image onto the medium by using an electrophotographic system and then fixing the image onto the medium. The image may be an image that is received by the communication unit 14 from a communication target or may be an image that is read by the image reading unit 17.

The CPU 11 of the image processing apparatus 10 controls each unit by running programs stored in the HDD 15 and the like, so that functions that will be described later are implemented.

Figure 2:
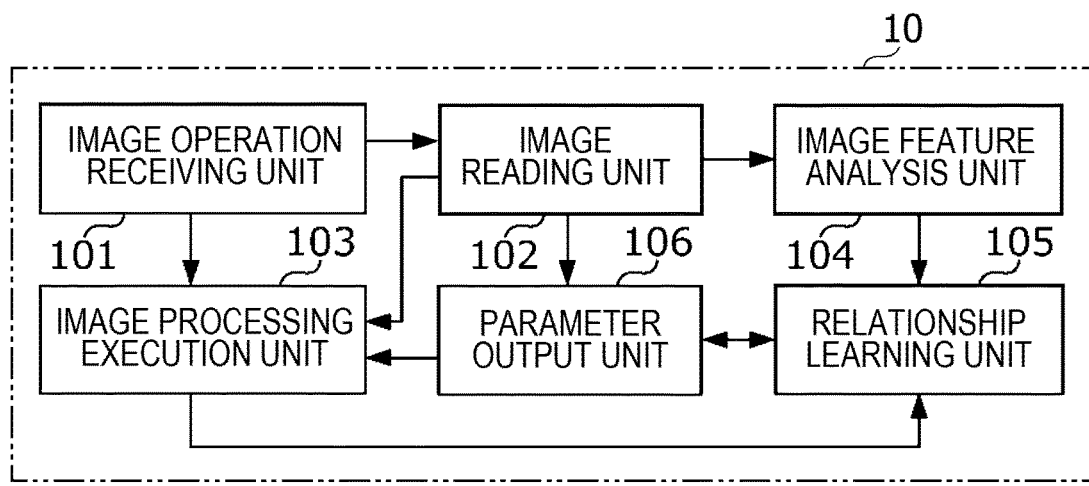
FIG. 2 is a diagram illustrating a functional configuration fabricated by the image processing apparatus.

FIG. 2 is a diagram illustrating a functional configuration fabricated by the image processing apparatus 10. The image processing apparatus 10 includes an image operation receiving unit 101, an image reading unit 102, an image processing execution unit 103, and an image feature analysis unit 104, a relationship learning unit 105, and a parameter output unit 106.

The image operation receiving unit 101 receives an operation for specifying an image that is to be subjected to processing and an operation for determining a parameter that is used in the processing. The image operation receiving unit 101 is an example of a "receiving unit" according to the present disclosure. The processing is, for example, FAX transmission processing, character recognition, translation processing or the like. The operation for specifying an image that is to be subjected to processing is, for example, an operation for instructing image scanning, an operation for instructing image transmission, an operation for specifying a storage destination of an image, or the like.

The parameter is, for example, a destination to which an image is transmitted, the image quality of an image, which is a processing result, the number of times the processing is performed on an image, the date and time when the processing is performed, or the like. Basically, an operation for specifying an image and an operation for determining a parameter are performed by a user. However, these specifying and determining operations may include the case where the operation for specifying an image and the operation for determining a parameter are each periodically performed by using, for example, a batch program created by a user.

The image reading unit 102 reads a processing target image by using the image reading unit 17. The image processing execution unit 103 performs processing based on a parameter that is determined by an operation received by the image operation receiving unit 101 on an image that is specified by an operation received by the image operation receiving unit 101. The image processing execution unit 103 is an example of an "execution unit" according to the present disclosure. For example, assume that a document (an example of a medium) is placed on the image processing apparatus 10, and FAX transmission processing is specified by an operation received by the image operation receiving unit 101.

In this case, first, the image processing execution unit 103 provides a parameter, such as image quality, that is determined by an operation received by the image operation receiving unit 101 to the image reading unit 102 and causes the image reading unit 102 to perform processing for reading an image. Then, the image processing execution unit 103 determines that the image, which has been read, is specified as a processing target image. Subsequently, the image processing execution unit 103 provides a parameter, such as a destination, determined by the operation received by the image operation receiving unit 101 to the communication unit 14, which is illustrated in FIG. 1, and causes the communication unit 14 to perform processing for transmitting the read image.

The image feature analysis unit 104 performs analyses on features of the image that is to be subjected to the processing performed by the image processing execution unit 103. The features include, for example, the size of the image, the orientation of the image, a title character string included in the image, the size of each character, the position of each character, the number of columns in a framework, the number of rows in the framework, the height of each row, and the color of each character. The relationship learning unit 105 learns the relationship between the parameter used by the image processing execution unit 103 when the image processing execution unit 103 performs the processing and the features of the image subjected to the processing.

In the present exemplary embodiment, for example, a deep learning technique is employed as a learning method. The term "relationship" refers to information that relates a feature to a parameter in such a manner that, for example, an image having a feature A is highly likely to be transmitted to a destination B (which is a parameter) and that an image having a feature C is highly likely to be processed into a color (which is a parameter) while an image having a feature D is highly likely to be processed into black and white (which is a parameter). The relationship learning unit 105 is an example of a "learning unit" according to the present disclosure.

When the image operation receiving unit 101 receives an operation for specifying a new image, the parameter output unit 106 outputs a parameter having a particular relationship with a feature of the new image on the basis of learning results obtained by the relationship learning unit 105. For example, when FAX transmission is instructed by an operation received by the image operation receiving unit 101, the parameter output unit 106 outputs a destination that has a particular relationship with a feature of the image read by the image reading unit 102 on the basis of the learning results obtained by the relationship learning unit 105, the learning results indicating the relationship between the feature of the image and the destination. The parameter output unit 106 is an example of an "output unit" according to the present disclosure.

Figures 3, 4:
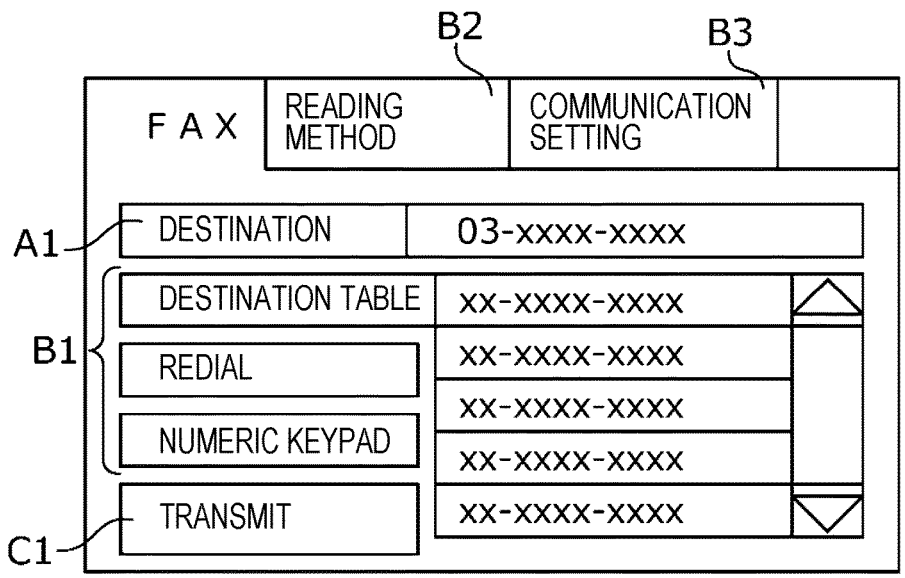
FIG. 3 is a diagram illustrating an example of a screen that is displayed by the image processing apparatus.
FIG. 4 is a diagram illustrating an example of information items stored in a relationship learning unit.

FIG. 3 is a diagram illustrating an example of a screen that is displayed by the image processing apparatus 10. When the image operation receiving unit 101 receives an operation for opening a FAX screen, the image operation receiving unit 101 causes the UI unit 16 to display a screen illustrated in FIG. 3. The image operation receiving unit 101 causes a list of FAX numbers registered in a telephone directory to be displayed in an area that is located on the right-hand side of "destination table" displayed in a number display area B1 of the screen. When a user specifies a desired FAX number, the image operation receiving unit 101 selects the specified FAX number as a destination FAX number and displays the destination FAX number in a destination display area A1.

Note that a user may scroll the list of FAX numbers, which is displayed in the number display area B1, by touching an image of a scroll operator that is displayed on the right-hand side of the list of FAX numbers. In addition, when a user touches "redial" displayed in the number display area B1, a FAX number that is the transmission destination that has recently used is read from redial memory and displayed in the destination display area A1.

When a user touches "numeric keypad" displayed in the number display area B1, an image of a numeric keypad is displayed on the UI unit 16. The user inputs a destination FAX number by operating the displayed numeric keypad. A destination FAX number that is displayed in the destination display area A1 may be cleared. When a user desires to clear the destination FAX number displayed in the destination display area A1, the user may touch the destination FAX number. As a result, the destination FAX number is cleared, so that nothing is displayed in the destination display area A1.

The screen illustrated in FIG. 3 includes an operator image B2 displayed as "reading method" and an operator image B3 displayed as "communication setting". As a result of a user touching the operator image B2, a reading method screen is opened, and the user specifies a parameter such as, for example, image quality, that is related to a reading method. In addition, as a result of a user touching the operator image B3, a communication setting screen is opened, and the user specifies a parameter such as, for example, communication mode or symbol rate, that is related to a communication setting.

In a state where a destination FAX number is displayed in the destination display area A1, when an operator image C1 displayed as "transmission" is selected, the image processing execution unit 103 causes the image reading unit 102 and the communication unit 14 to respectively perform image reading processing and image transmission processing by using a parameter that has been set.

In the present exemplary embodiment, a service for outputting a destination FAX number by using learning results obtained by the relationship learning unit 105 is provided to a user. For example, a user who desires to use this service may touch the operator image C1 displayed as "transmission" in a state where there is no destination FAX number displayed in the destination display area A1.

When this touching operation is performed, the image processing execution unit 103 causes the image reading unit 102 to read an image of a document and causes the image feature analysis unit 104 to analyze features of the image. Then, the parameter output unit 106 determines a list of FAX numbers having particular relationships with the features of the read image on the basis of the learning results obtained by the relationship learning unit 105 and displays the list of FAX numbers in the number display area B1. The user may select a desired FAX number from the list of FAX numbers as a destination FAX number.

FIG. 4 is a diagram illustrating an example of information items stored in the relationship learning unit 105. In the case illustrated in FIG. 4, the relationship learning unit 105 stores image information items that indicate features of an image that has been transmitted via FAX and parameters of the FAX transmission by associating the image information items and the parameters with one another. Here, the image information items include information items that indicate features such as the name of image data of the image that has been transmitted, the size of the image, the number of columns in the image, and the number of rows in the image. The image information items are generated by the image feature analysis unit 104 when the FAX transmission is performed. The parameters include information items that are received by the image processing execution unit 103 when the FAX transmission is performed, the information items including, for example, a destination of the FAX transmission and the image quality at which the image is read.

Figure 6:
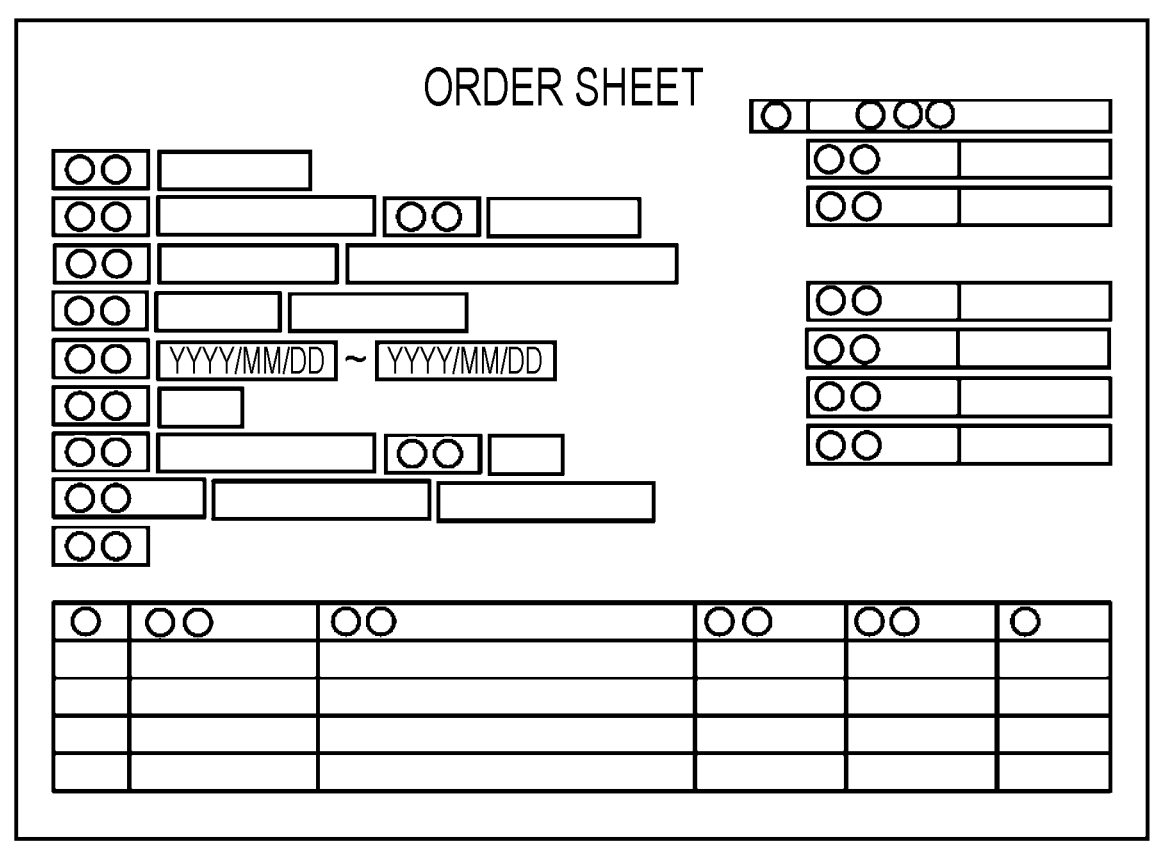

FIG. 5 and FIG. 6 are diagrams each illustrating an example of an image that is specified as a processing target. Each of the images illustrated in FIG. 5 and FIG. 6 is an example of an image of a business form to be transmitted via FAX. In the images, "0" represents a character. The business form (a purchase order) illustrated in FIG. 5 is used for, for example, placing an order with a company A, and the business form (an order sheet) illustrated in FIG. 6 is used for, for example, placing an order with a company B. The image of the business form illustrated in FIG. 5 and the image of the business form illustrated in FIG. 6 both include ruled lines and character strings, and the patterns of the ruled lines in FIG. 5 and FIG. 6 are different from each other. Characters that are written in business forms differ each time an order is placed.

In contrast, in a plurality of business forms having the same destination, the formats of the business forms, particularly the patterns of ruled lines, are likely to have common characteristics. More specifically, for example, in addition to the shape, the size, and the arrangement of a region that contains a table, the number of columns, the width of each of the columns, the number of rows, and the height of each of the rows (each of which is an element indicating the pattern of ruled lines) are likely to be common among a plurality of business forms having the same destination. This is because, when exchanging of business forms with a supplier, business forms in a format that is specified by the supplier are often used and because, even if there is no specified format, business forms in the same format are often used every time the destination is the same.

In addition, in the case where a business form is sent to the same destination every time, parameters such as image quality (including resolution, density, sharpness, black-and-white, and so forth) and magnification other than destination are often the same every time the business form is sent. Accordingly, in the present exemplary embodiment, the parameter output unit 106 outputs a destination on the basis of learning results obtained by the relationship learning unit 105 that learns while placing more weight on the relationship between a feature of an image representing a ruled line and a destination than on the relationship between a feature of an image representing a character string and a destination.

Note that the relationship learning unit 105 may be configured not to learn one of the above two types of relationships that is less weighted. In addition, an effective method of placing weight when the learning operation is performed is not limited to that described above. For example, it is likely that a character string that represents the title of a business form ("purchase order", "order sheet", or the like) has a stronger relationship with a destination than the other character strings do. Accordingly, the parameter output unit 106 may output a destination on the basis of learning results obtained by the relationship learning unit 105 that learns while placing more weight on the relationship between a feature of an image representing the title of a business form and a destination than on the relationship between a feature of an image representing a character string, which is different from the character string representing the title of a business form, and a destination.

Similar to a ruled line, a printed character (a character in a font) is another feature that is common among a plurality of business forms that are to be sent to the same destination, and a printed character has a stronger relationship with a destination than a handwritten character does. Accordingly, the parameter output unit 106 may output a destination on the basis of learning results obtained by the relationship learning unit 105 that learns while placing more weight on the relationship between a feature of an image representing a printed character and a destination than on the relationship between a feature of an image representing a handwritten character and a destination. Regarding the way of distinguishing a printed character and a handwritten character, for example, the reliability of results of character recognition is calculated, and a character having reliability that is equal to or greater than a threshold and a character having reliability that is less than the threshold are respectively considered to be a printed character and a handwritten character.

Based on the above-described configuration, the image processing apparatus 10 performs leaning processing for learning the relationship between a feature of an image and a determined parameter and parameter output processing for outputting a new parameter on the basis of learning results of the learning processing.

Figure 7:
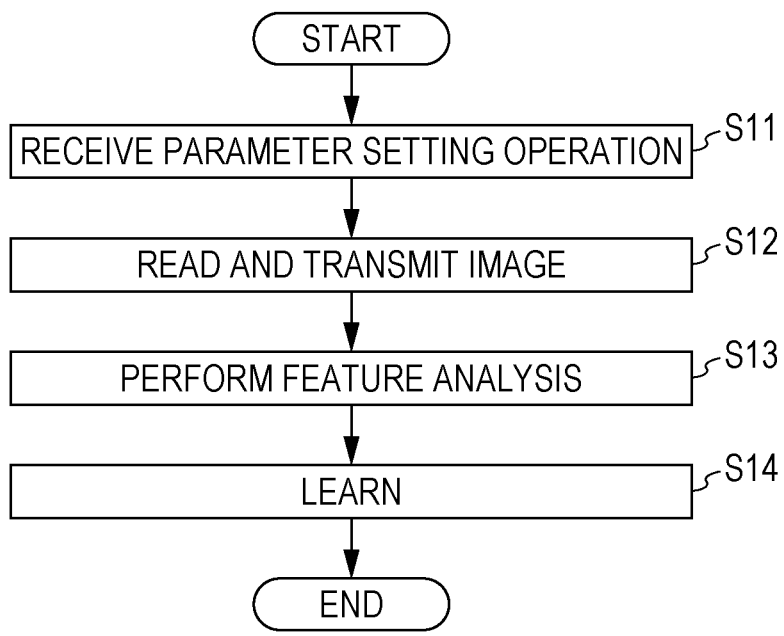
FIG. 7 is a flowchart illustrating an example of an operation process performed by the image processing apparatus in learning processing.

FIG. 7 is a flowchart illustrating an example of an operation process in the learning processing. The operation process illustrated in FIG. 7 is started when, for example, a user places a document on the image processing apparatus 10 and performs an operation for opening the FAX screen.

First, the image operation receiving unit 101 of the image processing apparatus 10 receives an operation for setting a parameter of FAX transmission, such as a FAX number or image quality (step S11). Next, the image processing execution unit 103 of the image processing apparatus 10 causes the image reading unit 102 to read an image of the document in accordance with the parameter set by the operation received by the image operation receiving unit 101 and causes the communication unit 14 to transmit the read image (step S12).

Next, the image feature analysis unit 104 of the image processing apparatus 10 analyzes a feature of the image that is transmitted (step S13). Subsequently, the relationship learning unit 105 of the image processing apparatus 10 learns the relationship between the feature of the image analyzed in step S13 and the parameter set in step S11 (step S14). After that, the image processing apparatus 10 terminates the operation process in the learning processing.

Figure 8:
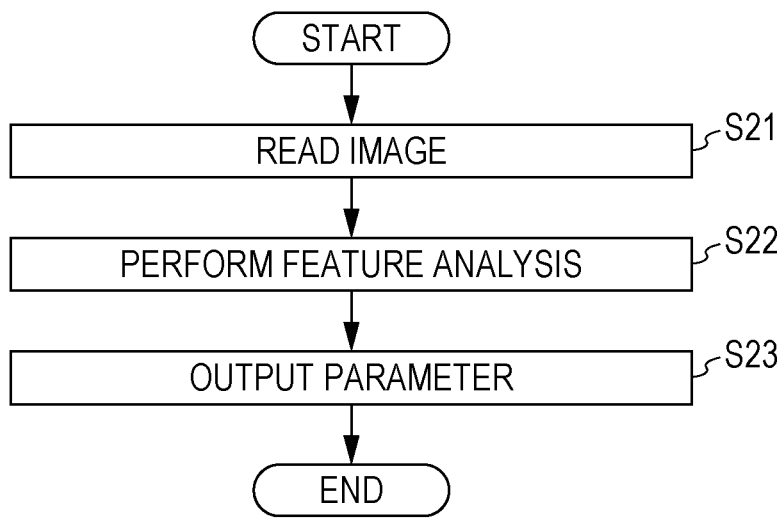
FIG. 8 is a flowchart illustrating an example of an operation process performed by the image processing apparatus in parameter output processing.

FIG. 8 is a flowchart illustrating an example of an operation process in the parameter output processing. The operation process illustrated in FIG. 8 is started when, for example, a user places a document on the image processing apparatus 10, performs an operation for opening the FAX screen, and touches the operator image C1 illustrated in FIG. 3 in a state where a destination FAX number is not input as mentioned above. First, the image processing execution unit 103 of the image processing apparatus 10 causes the image reading unit 102 to read an image of the document (step S21).

Next, the image feature analysis unit 104 of the image processing apparatus 10 analyzes a feature of the image read in step S21 (step S22). Next, the parameter output unit 106 of the image processing apparatus 10 outputs, on the basis of the learning results of the learning processing illustrated in FIG. 7, a parameter that has a particular relationship with the feature of the image analyzed in step S22 (step S23). After that, the image processing apparatus 10 terminates the operation process in the output processing.

Although various ways of outputting a parameter may be considered, in the present exemplary embodiment, the parameter output unit 106 stores a parameter that has a particular relationship with a feature of an image and displays a FAX number, which is included in the parameter, in the number display area B1 illustrated in FIG. 3. There is a case where a plurality of parameters each of which has a particular relationship with a feature of an image are obtained. In this case, the parameter output unit 106 displays a list of FAX numbers, which is included in these parameters, in the number display area B1 illustrated in FIG. 3.

When a user touches a desired FAX number that is displayed in the number display area B1, the FAX number is displayed in the destination display area A1 as a destination FAX number. In this state, when the operator image C1 displayed as "transmission" is selected, the learning processing illustrated in FIG. 7 is performed. In this case, a parameter that is output by the parameter output unit 106 and that includes the FAX number selected by the user is set for the image processing execution unit 103, and the image reading operation and the image transmission operation in step S12 are performed.

For example, in order to reduce the time and effort that is expended by a user when the user sets a parameter, there is a method of outputting a history of parameters that have been used in the past. However, in this method, the number of selectable parameters increases as the number of parameters in the history increases, and thus, it takes more time and effort. In the present exemplary embodiment, when a new image is specified, a parameter that has a particular relationship with a feature of the new image is output on the basis of results of learning the relationship between a parameter used in processing that has been performed in the past and a feature of an image subjected to the processing.

As a result, for example, when the image of the business form illustrated in FIG. 5 is newly specified, a destination that corresponds to this business form is output, and when the image of the business form illustrated in FIG. 6 is newly specified, a destination that corresponds to this business form is output. In this manner, a parameter that has been used in the past for an image that has a feature common to a newly specified image is output, and thus, the time and effort that is expended by a user when processing using an image is performed may be reduced more than that in the case of simply outputting a history of parameters that have been used in the past.

In the present exemplary embodiment, the image processing execution unit 103 performs processing for transmitting a specified image as processing based on a parameter, and the parameter output unit 106 outputs a transmission destination that has been used in the past for an image that has a feature similar to a parameter of a new image as a parameter that has a particular relationship. As a result, a destination to which an image that is similar to the specified image is often transmitted is set as a parameter of a transmission destination.

In addition, in the present exemplary embodiment, an image includes a ruled line and a character string, and the parameter output unit 106 outputs a transmission destination on the basis of learning results obtained by the relationship learning unit 105 that learns while placing more weight on the relationship between a feature of an image representing a ruled line and a destination than on the relationship between a feature of an image representing a character string and a destination. As a result, a destination to which a business form is often transmitted may be accurately output compared with the case where the relationship learning unit 105 does not place weight on the relationship between a feature of an image representing a ruled line and a destination.

[2] Modification

The above-described exemplary embodiment is merely an exemplary embodiment of the present disclosure and may be modified as below. In addition, the exemplary embodiment and the following modifications may be combined and implemented as necessary.

[2-1] Image Before Conversion

The image processing execution unit 103 may sometimes perform processing on a converted image that is obtained by performing conversion such as low-resolution conversion or black-and-white conversion on a specified image. For example, in FAX transmission, by performing such conversion, the communication traffic volume is reduced, and the time taken for communication is reduced. On the other hand, it is likely that features of an image that has undergone such conversion are more faded than those before the image undergoes the conversion.

Accordingly, in the present modification, the parameter output unit 106 may output parameters on the basis of learning results obtained by the relationship learning unit 105 that learns about an image that has not yet undergone conversion. Since features of an image before the image undergoes conversion stands out more than those after the image has undergone the conversion and has been actually transmitted, the effect of learning is enhanced compared with the case where the relationship learning unit 105 learns by using an image that has been converted and whose parameters have been faded. As a result, more accurate parameters may be output.

[2-2] Image Output

The parameter output unit 106 may output a determined parameter and an image that has been processed by using the parameter. More specifically, the parameter output unit 106 reads image data that is related to a parameter included in the information items stored in the relationship learning unit 105 illustrated in FIG. 4, the parameter being to be output by the parameter output unit 106, and causes the image to be displayed on, for example, the UI unit 16.

According to this modification, a user checks if an image that is displayed on the UI unit 16 and that has been transmitted in the past is similar to an image that is to be transmitted. This makes it easier for a user to determine whether a parameter output by the parameter output unit 106 is appropriate compared with the case where an image is not output.

In addition, a plurality of parameters each of which has a particular relationship with one of features of a new image may sometimes be generated. In this case, the parameter output unit 106 may output an image that has most recently been processed among the images that have been processed by using parameters. According to this modification, the most recently transmitted image is displayed on the UI unit 16, and this makes it easier for a user to remember the image that has most recently been transmitted compared with the case where a transmitted image that is not the most recently transmitted image is output.

[2-3] Processing Execution Period

When processing using a parameter is performed in a predetermined period of time, the parameter output unit 106 may output the parameter. For example, in the case of FAX transmission, when a period during which a FAX number has not been used for FAX transmission is longer than a predetermined period of time, the parameter output unit 106 does not output the FAX number.

The longer the period during which a parameter has not been used, the more likely the parameter is to be unnecessary, and consequently, it is unlikely that this parameter will be used again. According to the present modification, as described above, it is determined whether each parameter is to be output, and thus, a parameter that has not been used for a long period of time is prevented from being output. As a result, only parameters that are more needed by a user are output, and the time and effort needed for specifying a parameter may be reduced compared with the case of not considering a period during which a parameter has not been used.

[2-4] Substitute for Parameter

There is a case where a parameter includes a first parameter and a second parameter that are associated with each other. For example, the first parameter is a FAX number, and the second parameter is a destination ID. In this case, the parameter output unit 106 may store beforehand associating information in which the first parameter and the second parameter are associated with each other and may output a parameter in the following manner.

First, the image operation receiving unit 101 receives an operation for determining the first parameter, and the image processing execution unit 103 performs processing on the basis of the first parameter determined by the operation. An operation for determining the second parameter is not performed at this stage. Then, the parameter output unit 106 outputs a parameter that has a particular relationship with a feature of a new image on the basis of learning results obtained as a result of the relationship learning unit 105 learning about the second parameter that is associated with the first parameter, which has been used by the image processing execution unit 103 at the time of performing the processing.

In the above case, a destination ID (the second parameter) is used as a substitute for a FAX number (the first parameter) in the learning operation. Thus, for example, even if a destination FAX number is changed, by changing a FAX number that is associated with a destination ID in the associating information, the learning operation may be continued while using the same destination ID. In the present modification, the learning operation is performed by using the second parameter as mentioned above, so that the learning contents will not go to waste even if the first parameter is changed.

In the present modification, there are two major methods for determining a parameter. In the first determining method, a user directly determines a FAX number (the first parameter). In this case, the image operation receiving unit 101 receives an operation for directly determining a FAX number. Then, when a new image is specified, the parameter output unit 106 outputs a FAX number (the first parameter) that is associated with a destination ID (the second parameter) having a particular relationship with a feature of the specified new image.

In the second determining method, a user determines a destination ID (the second parameter). In this case, the image operation receiving unit 101 receives an operation for determining a destination ID as an operation for indirectly determines a FAX number (the first parameter) that is associated with the destination ID. Then, when a new image is specified, the parameter output unit 106 outputs a destination ID (the second parameter) having a particular relationship with a feature of the specified new image.

Both in the first determining method and the second determining method, one of the two types of parameters, which are the first parameter and the second parameter, the one parameter being determined by a user, is output. In other words, a parameter which is the same type as a parameter selected or input by a user is output, and thus, the output parameter is likely to serve as a useful reference for the user, and user convenience is enhanced compared with the case where a different type of parameter is output.

[2-5] Invalidation of Parameter

The image operation receiving unit 101 may receive an operation for invalidating a parameter (an invalidation operation). The operation for invalidating a parameter is an operation for making a parameter invalid such that a user is not able to choose the parameter, and this operation includes, for example, an operation for making an operator indicating a parameter nonreactive or an operation for removing the operator so as not to be displayed.

When the operation for invalidating a parameter is performed, the parameter output unit 106 may be configure not to determine a particular relationship between a parameter that has become invalid and a feature of a new specified image. For example, the parameter output unit 106 stores beforehand flag information items used for identifying a valid parameter and an invalid parameter and updates the flag information items each time the invalidation operation is performed so as to determine a particular relationship by using only a valid parameter.

In the processing for determining a particular relationship, if a particular relationship between a destination that is no longer in use and a feature of a new image is also determined, the load of this determination processing increases each time a new destination is registered. In the present modification, this determination is not performed on a parameter that has become invalid in the manner described above, so that the load of processing for determining a particular relationship is reduced more than that in the case where the above determination is performed on all the parameters that have been registered once.

Note that also the relationship learning unit 105 may perform the relationship learning processing only on parameters that are used by the image processing execution unit 103 when the image processing execution unit 103 performs processing excluding a parameter that has become invalid. In this case, for example, similar to the parameter output unit 106, the relationship learning unit 105 may determine whether each parameter is valid or invalid by using the flag information items. As a result, the load of processing that is performed for relationship learning is reduced more than that in the case where the relationship learning processing is performed on all the parameters that have been registered once.

[2-6] Devices for Implementing Each Function

Devices that implement each of the functions illustrated in FIG. 2 are not limited to those illustrated in the drawings. For example, some functions of the image processing apparatus 10 may be implemented by other devices.

Figure 9:
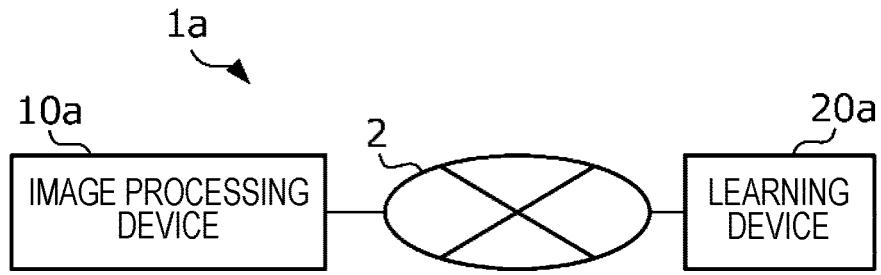
FIG. 9 is a diagram illustrating the overall configuration of an image processing system according to a modification.

FIG. 9 is a diagram illustrating the overall configuration of an image processing system 1a according to the present modification. The image processing system 1a includes a communication line 2, an image processing apparatus 10a, and a leaning device 20a. The leaning device 20a is a device that has a function of learning the relationship between a parameter and a feature of a target image.

Figure 10:
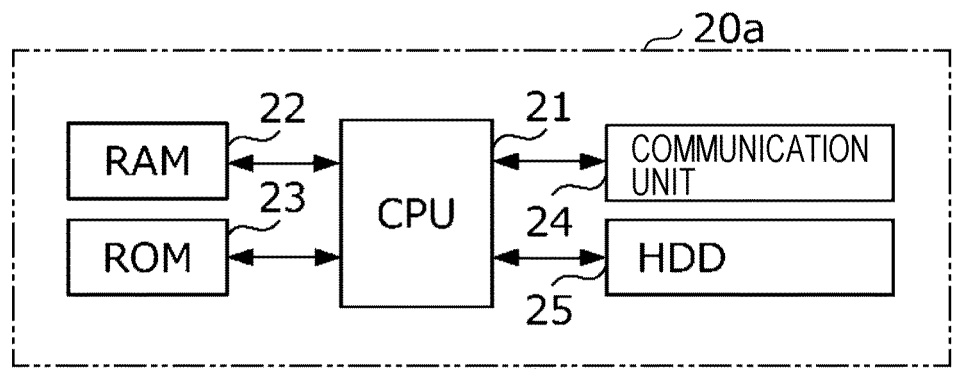
FIG. 10 is a diagram illustrating a hardware configuration of a leaning device.

FIG. 10 is a diagram illustrating a hardware configuration of the leaning device 20a. The leaning device 20a is a computer that includes units including a CPU 21, RAM 22, ROM 23, a communication unit 24, and an HDD 25. Each of these units is the same type as one of the units illustrated in FIG. 1, the one unit having the same name as the unit, even though there are differences in performance, specifications, and the like between them.

Figure 11:
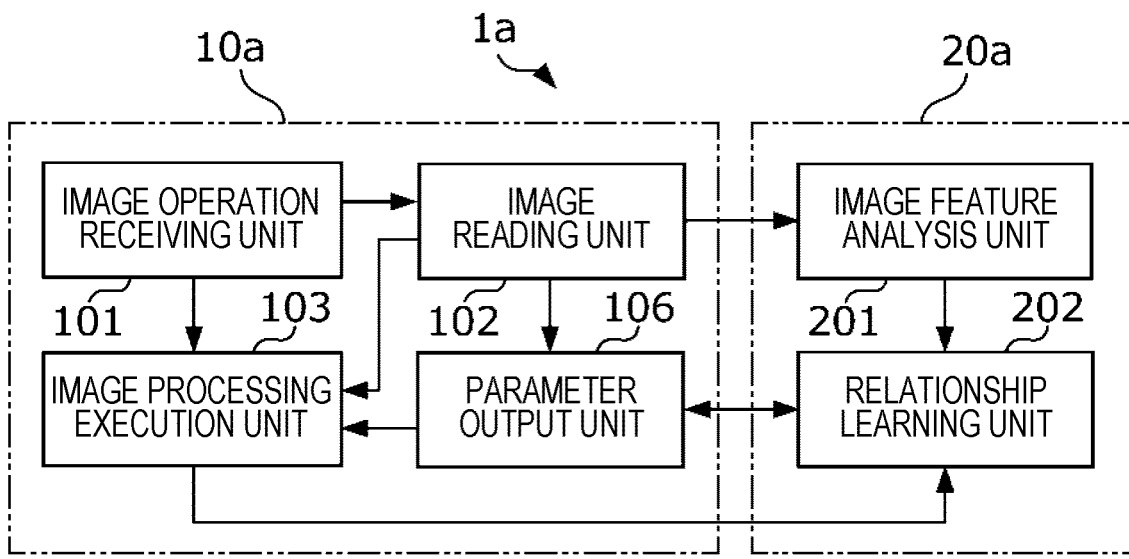
FIG. 11 is a diagram illustrating a functional configuration fabricated by the image processing system.

FIG. 11 is a diagram illustrating a functional configuration fabricated by the image processing system 1a. The image processing apparatus 10a includes the image operation receiving unit 101, the image reading unit 102, the image processing execution unit 103, and the parameter output unit 106. The leaning device 20a includes an image feature analysis unit 201 and a relationship learning unit 202. In the image processing apparatus 10a, the image operation receiving unit 101 receives an operation for specifying an image that is to be subjected to processing and an operation for determining a parameter that is used in the processing.

The image processing execution unit 103 performs processing based on a parameter determined by the operation received by the image operation receiving unit 101 on an image specified by the operation received by the image operation receiving unit 101. For example, when FAX transmission processing is specified by the operation received by the image operation receiving unit 101, the image processing execution unit 103 performs FAX transmission processing by using the image reading unit 102 and so forth.

In this case, the image processing execution unit 103 controls the image reading unit 102 and so forth in accordance with the parameter determined by the operation received by the image operation receiving unit 101. The image reading unit 102 transmits an image read thereby to the leaning device 20a. The parameter output unit 106 transmits the parameter set for the image processing execution unit 103 to the leaning device 20a. In the leaning device 20a, the image feature analysis unit 201 receives the image from the image processing apparatus 10a and analyzes a feature of the image.

Then, the relationship learning unit 202 learns the relationship between the feature of the image and the parameter received thereby from the image processing apparatus 10a. When the image operation receiving unit 101 receives an operation for specifying a new image, the parameter output unit 106 of the image processing apparatus 10a refers to learning results obtained by the relationship learning unit 105 of the leaning device 20a via the communication line 2 and outputs a parameter that has a particular relationship with a feature of the new image.

In the present embodiment and the above-described exemplary embodiment, which is illustrated in FIG. 2, although the image operation receiving unit 101 receives both an operation for specifying an image and an operation for determining a parameter, each of these operations may be received by a corresponding one of two operation receiving units. In other words, as long as the functions illustrated in FIG. 2 and the like are implemented by an image processing apparatus or the entire image processing system, sharing of functions among the units and the operating range of each of the functions may be freely set.

[2-7] Image Processing and Parameter

In the above exemplary embodiment, FAX transmission processing has been described as the processing that is performed by the image processing execution unit 103. However, the processing that is performed by the image processing execution unit 103 may be other processing such as copying, printing, character recognition, translation, or photo processing that is to be performed on an image. The processing that is performed by the image processing execution unit 103 may be any processing as long as the processing is performed on a specified image on the basis of a parameter determined by a user. In the exemplary embodiment, a parameter that is related to FAX transmission is determined. A parameter may be determined in accordance with the processing that is performed on an image.

[2-8] Method of Specifying Image

In the exemplary embodiment, although an image to be scanned is specified by an operation including setting a document and pressing a FAX start button, a method of specifying an image is not limited to this. A processing target image may be specified by an operation of transmitting image data from a personal computer. Alternatively, an operation including displaying an image stored in the image processing apparatus 10 and selecting the image may be performed as the specifying operation.

[2-9] Feature of Image

In the exemplary embodiment, features of an image are represented by features of the entire image (e.g., size and orientation), features of grid lines that are included in the image and drawn by using straight lines (e.g., the number of columns, the number of rows, and intervals), and features of a character included in the image (e.g., size, position, and orientation). Features of an image may also be represented by, other than the above features, the number of colors in the image, formation timing of the image, the shooting location of a photograph, and a person included in a photograph.

[2-10] Learning Unit

In the exemplary embodiment, although a deep learning technique is used, the present disclosure is not limited to the deep learning technique. Neural networks, support-vector machines, Bayesian networks, other artificial intelligence techniques, and so forth may be used for learning the relationship between a feature of an image and a parameter. The learning unit learns a parameter determined by a person, and thus, it is only necessary for the learning unit to be capable of performing supervised learning.

[2-11] Relationship

A parameter that has a relationship with a feature of an image, the relationship being to be learned by the relationship learning unit 105, is not limited to a destination. The relationship learning unit 105 may be configured to learn the relationship between a feature of an image and processing with high image quality, the relationship between a feature of an image and processing with low image quality, the relationship between a feature of an image and the number of destinations, the relationship between a feature of an image and the presence or absence of color, and so forth.

[2-12] Output Method

In the exemplary embodiment, the parameter output unit 106 outputs a parameter to the display unit. However, the parameter output unit 106 may output a parameter to a medium or may output a parameter to an e-mail address of a user. In addition, a unit that performs processing based on a parameter output by the parameter output unit 106 may be provided.

For example, when a user sets a document and instructs FAX transmission by setting a FAX number, the parameter output unit 106 may output a FAX number that has a particular relationship with a feature of an image obtained by reading the document, and when this FAX number is different from the FAX number set by the user, an alarm may be output to the user. In this configuration, an accident in which an image is transmitted to a destination that is different from a destination to which the image would have been transmitted is prevented from occurring.

[2-13] Category of Disclosure

The present disclosure may be perceived not only as information processing apparatuses such as an image processing apparatus and a leaning device but also as an information processing system (an example of which is an image processing system) that includes each of the information processing apparatuses. In addition, the present disclosure may also be perceived as an information processing method for realizing processing operations that are performed by the information processing apparatuses and as a program for causing a computer that controls each of the information processing apparatuses to function. The program may be provided by being recorded in a recording medium, such as an optical disc, or may be provided by being downloaded by a computer via a communication line, such as the Internet, and being installed by the computer so as to be usable.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor programmed to operate as:
a receiving unit that receives an operation for specifying an image to be subjected to processing and an operation for determining a parameter to be used in the processing;
an execution unit that performs processing based on the determined parameter on the specified image; and
an output unit that outputs, when the receiving unit receives an operation for specifying a new image, a parameter that has a particular relationship with a feature of the new image on a basis of a learning result obtained by a learning unit that learns a relationship between a parameter used in the processing that has been performed before by the execution unit and a feature of an image that has undergone the processing,
wherein the execution unit performs processing for transmitting the specified image as the processing based on the determined parameter,
wherein the output unit outputs a transmission destination that has been used before for an image having a feature similar to a feature of the new image as the parameter that has the particular relationship,
wherein the image includes a ruled line and a character string, and
wherein the output unit outputs the transmission destination on a basis of a learning result obtained by the learning unit that learns while placing more weight on a relationship between a feature of an image representing the ruled line and the parameter used in the processing that has been performed before than on a relationship between a feature of an image representing the character string and the parameter used in the processing that has been performed before.

2. The information processing apparatus according to claim 1,
wherein the execution unit performs the processing on a converted image that is obtained by performing conversion on the specified image, and
wherein the output unit outputs the output parameter on a basis of a learning result obtained by the learning unit that learns about the image that has not yet undergone the conversion.

3. The information processing apparatus according to claim 2,
wherein the output unit outputs the output parameter and an image processed by using the output parameter.

4. The information processing apparatus according to claim 1,
wherein the output unit outputs the output parameter and an image processed by using the output parameter.

5. The information processing apparatus according to claim 4,
   wherein the output unit outputs an image that has most recently been processed among images that have been processed by using the output parameter.

6. The information processing apparatus according to claim 1,
   wherein, when the processing using the determined parameter is performed in a predetermined period of time, the output unit outputs the determined parameter.

7. The information processing apparatus according to claim 1,
   wherein a first parameter and a second parameter that are associated with each other are provided,
   wherein the receiving unit receives an operation for determining the first parameter,
   wherein the execution unit performs the processing on a basis of the determined first parameter, and
   wherein the output unit outputs the parameter that has a particular relationship with a feature of the new image on a basis of a learning result obtained by the learning unit that learns about the second parameter that is associated with the first parameter used when the execution unit performs processing.

8. The information processing apparatus according to claim 7,
   wherein the receiving unit receives an operation for directly determining the first parameter, and
   wherein the output unit outputs the first parameter that is associated with the second parameter having the particular relationship.

9. The information processing apparatus according to claim 7,
   wherein the receiving unit receives an operation for indirectly specifying the first parameter that is associated with the second parameter by determining the second parameter, and
   wherein the output unit outputs the second parameter having the particular relationship.

10. The information processing apparatus according to claim 1,
    wherein the receiving unit receives an operation for invalidating a parameter, and
    wherein the output unit does not determine the particular relationship with respect to the invalidated parameter.

\* \* \* \* \*